F. E. BRIGHT.
BALL BEARING.
APPLICATION FILED JUNE 1, 1906.
1,004,738.
Patented Oct. 3, 1911.
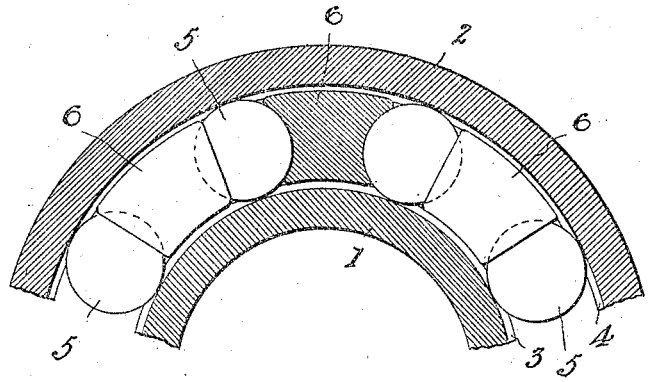
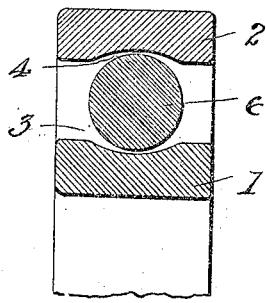
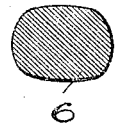
Witnesses
Chas. K. Davies
Lilian Brock
Inventor
Fred E. Bright
By Brock & Smith
Attorneys

UNITED STATES PATENT OFFICE.

FRED EUGENE BRIGHT, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

BALL-BEARING.

1,004,738.   Specification of Letters Patent.   Patented Oct. 3, 1911.

Application filed June 1, 1906.  Serial No. 319,782.

*To all whom it may concern:*

Be it known that I, FRED EUGENE BRIGHT, a citizen of the United States, and a resident of Philadelphia, in the county of Philadelphia and State of Pennsylvania, have invented a new and useful Improvement in Ball-Bearings, of which the following is a specification.

My invention relates to ball-bearings and more particularly to those in which separators are employed between adjacent balls.

It also relates to the separators used and to the method of assembling the bearing.

The characteristics and advantages of my invention are fully described hereafter in connection with the accompanying drawing in which exemplifying structures are illustrated.

Figure 1 is a transverse section of a segment of a ball-bearing to which my invention is applied, the section being taken on a plane intersecting the ball centers; Fig. 2, a transverse section intersecting one of the separators; and Fig. 3, a detail of a cross-section of a separator before it is inserted in the bearing.

Referring first to Figs. 1 and 2: 1 is an inner bearing ring; 2, an outer ring; 3, 4, ball races, usually of curved cross-section, formed in said rings, respectively; 5, a series of balls running in the races; 6, separators interposed between adjacent balls. The individual separators conveniently consist of such material as malleable metal, for instance Babbitt metal.

As shown in Fig. 3, the separators 6 are conveniently originally made in somewhat flattened shape, so that they may be inserted between the bearing rings 1 and 2. The separators are so inserted, one between each two adjacent balls, and then by any suitable means, such for example as placing a die at one side of the separator and applying pressure by a punch and hammer at the other side, the shape of the separator can be changed to approximately that shown in Fig. 2, that is, so that it conforms more or less to the shape of the ball races, and is prevented from displacement from between the balls by contact with parts of the bearing. The ends of the separators adjacent the balls may be flat, or if desired, they may be more or less cupped, as seen in Fig. 1, so that each cup embraces a segment of a ball. The engagement of these cups with the balls is sufficient to prevent displacement of the separators, and this means may be relied on, together with the other expedient referred to, or independently thereof, for holding the separators in place. It is usually impractical to insert the separators if all the cups are formed prior to insertion in the bearing. Therefore one or more of these cups is conveniently formed, after its separator is put into the bearing, by any suitable means such for instance as by the use of a punch and die, as described above.

I contemplate the use of any material for the separators which is susceptible to the necessary manner of treatment described.

The balls may be inserted in the bearing by the eccentric displacement method, described in U. S. Patent 838303, to Robert Conrad, December 11, 1906, or if the number of balls is too great to permit of this method, a side filling opening or any other suitable expedient for inserting the balls may be used.

I do not intend to limit myself herein to details, but contemplate any changes in my invention which may be made within its spirit.

I claim:

1. In a ball bearing comprising two bearing rings having races of curved cross section and balls in the races, a homogeneous anti-friction metal separator interposed between two adjacent balls, the separator extending somewhat into the ball races.

2. In a ball bearing comprising two bearing rings having races of curved cross section and balls in the races, a homogeneous anti-friction metal separator interposed between two adjacent balls, the separator extending somewhat into the ball races, the ends of the separator being also cupped to engage segments of adjacent balls.

3. In a non-adjustable rotary ball bearing comprising two bearing rings having races of curved cross section and balls in the races, a homogeneous anti-friction metal separator interposed between two adjacent balls, the separator extending somewhat into both of the ball races.

4. In a non-adjustable rotary ball bearing comprising two bearing rings having races of curved cross-section and balls in the races, a homogeneous anti-friction metal separator interposed between two adjacent balls, the separator extending somewhat into both of the ball races, the ends of the separator being also cupped to engage segments of the balls.

In testimony whereof I have affixed my signature in the presence of two witnesses.

FRED EUGENE BRIGHT.

Witnesses:
HENRY HESS,
T. H. M'CALLA.